No. 614,558. Patented Nov. 22, 1898.
I. KOHN.
FILTER.
(Application filed Dec. 9, 1897.)
(No Model.) 2 Sheets—Sheet 1.

No. 614,558. Patented Nov. 22, 1898.
I. KOHN.
FILTER.
(Application filed Dec. 9, 1897.)
(No Model.) 2 Sheets—Sheet 2.

Witnesses:
Inventor:
Isidor Kohn,

UNITED STATES PATENT OFFICE.

ISIDOR KOHN, OF CHICAGO, ILLINOIS.

FILTER.

SPECIFICATION forming part of Letters Patent No. 614,558, dated November 22, 1898.

Application filed December 9, 1897. Serial No. 661,274. (No model.)

*To all whom it may concern:*

Be it known that I, ISIDOR KOHN, a citizen of the United States, residing at Chicago, in the county of Cook and State of Illinois, have invented a new and useful Improvement in Filters, of which the following is a specification.

My invention relates to an improved filter for use in filtering water and liquors of various kinds; and my object is to provide a filter of simple and cheap construction capable of effectually filtering a large quantity of liquid in a short time, not easily clogged, and which is capable of being easily and quickly cleansed.

My invention consists in the improved filter herein described, the means for producing readily-replaceable layers of pulp of varying densities, and in the various novel combinations of parts set forth and claimed.

Figure 1:
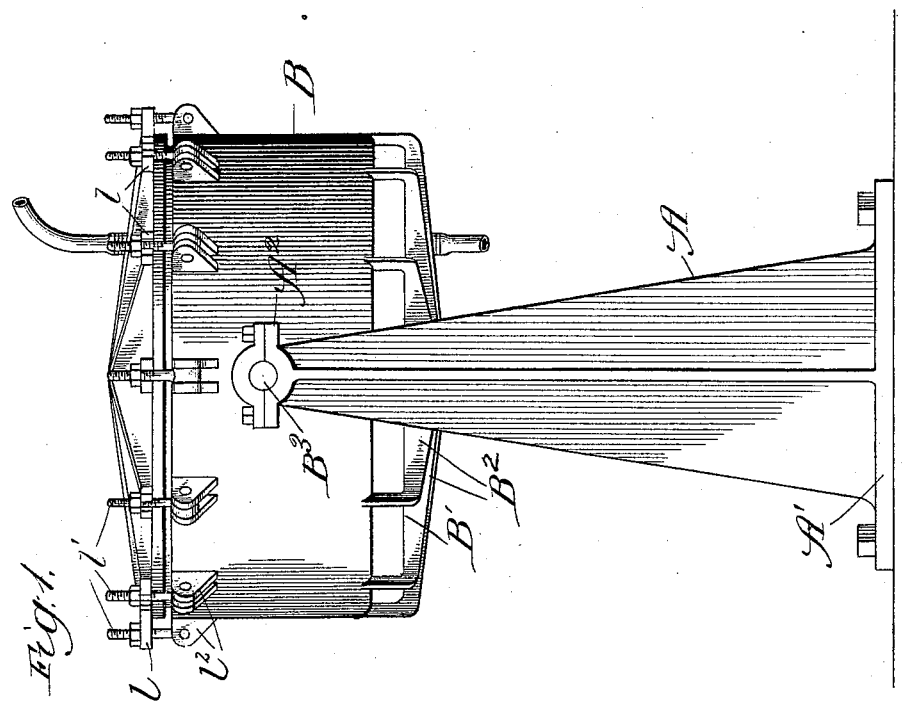
Figure 2:
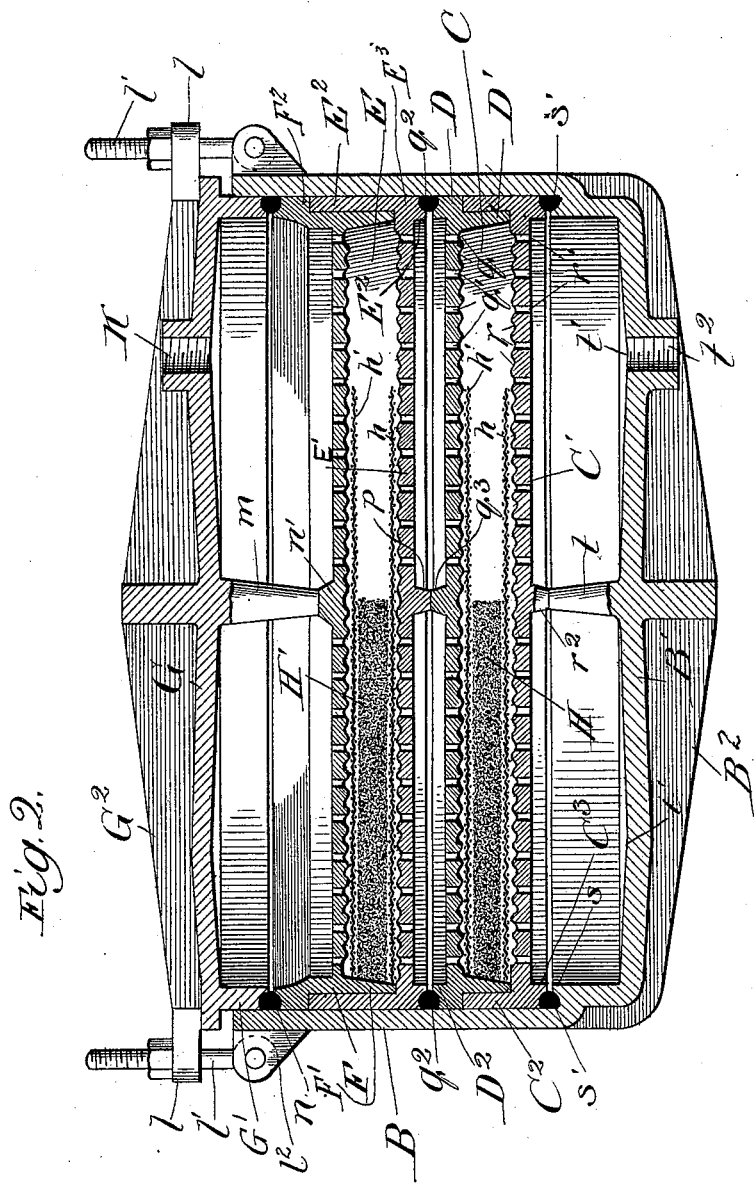

In the accompanying drawings, Figure 1 is a view in side elevation of a filter embodying my improvements; and Fig. 2, a vertical section, in the plane of the paper of Fig. 1, of the filter detached from the frame.

A is the frame, which may comprise simply two standards of convenient height provided with bases $A'$, adapted to be secured to a foundation, or the standards may be connected by and rest upon a single base-plate.

B is the filter-cylinder, within which are located the removable pulp-chambers. It is provided on its outer cylindrical surface, midway between its top and bottom, with trunnions $B^3$, journaled in boxes $A^2$ at the tops of the standards A. The cylinder is provided with an integrally-cast bottom $B'$, provided externally with strengthening-ribs $B^2$ and internally with a central lug $t$. The bottom preferably is of the configuration shown, being provided with an annular channel $t'$, having sloping sides, into the bottom of which opens a perforation $t^2$, which may be connected with a supply-pipe. The cylinder is provided interiorly near its bottom with an annular shoulder or offset $s$, grooved, as shown, to receive an annular rubber gasket $s'$.

Fitting closely within the cylinder is a circular pan or pulp-chamber C, having a bottom $C'$, provided on its upper surface with a large number of concentric annular grooves $r$, into which open a large number of small perforations $r'$, an upwardly-extending flange or rim $C^2$, and a downwardly-extending annular flange $C^3$, provided with an annular groove contacting with the gasket $s'$. The bottom is provided at the center of its under surface with a lug $r^2$, which rests upon the lug $t$. Upon the chamber C is a lid or cover D, which rests at its circumferential portion upon the rim $C^2$ and is provided near the circumference with a downwardly-extending flange $D'$, which fits snugly within the rim $C^2$. The under surface of the lid is provided with a series of concentric grooves $q$, into which open perforations $q'$, with which the lid is provided. The lid is provided with an upwardly-extending flange $D^2$, grooved to receive a gasket $q^2$, and centrally of the upper surface of the lid is a lug $q^3$, upon which rests a lug $p$ of a second pulp-chamber E, provided with a perforated bottom $E'$, an upwardly-extending flange $E^2$, and a downwardly-extending grooved flange $E^3$, which rests upon the gasket $q^2$.

The chamber E is provided with a top F similar to the top D on the chamber C, except that its downwardly-extending flange $F'$, which fits within the rim $E^2$, is wider than the corresponding flange $D'$ on the lid D. The same relation as to size exists between the flange $E^2$ and the flange $C^2$. The lid F is provided with an upwardly-extending flange $F^2$, grooved to receive a gasket $n$, and centrally with a lug $n'$, upon which bears a lug $m$, depending from a cover G, with which the cylinder is provided. The cover G is provided with a flange $G'$, which fits within the cylinder, the grooved edge of which rests upon the gasket $n$. Exteriorly the top is provided with strengthening-ribs $G^2$ and circumferentially with slotted lugs $l$ to receive bolts $l'$, pivotally joined to lugs $b^2$ upon the upper border of the cylinder B, and supplied with nuts which serve to force the parts together after the pulp-chambers have been filled.

Within the pulp-chambers are placed fine gauze or perforated metal screens $h$, upon which the pulp layers H H' are spread, and above these pulp layers are placed other metal screens $h'$, over which the covers of the chambers are placed.

It should be noted that with the construction here shown the pulp-chambers can be filled full or even above their tops with pulp and yet the lids be forced on without difficulty, the downwardly-depending flanges of the tops serving to force the material inward and to leave a clean joint at the meeting surfaces of the chambers and their tops. The meeting lugs and flanges of the various parts are so relationed that considerable force is exerted upon the gaskets before the metal parts contact, and thereby tight joints are effected at the joints between the flanges and between the flanges and the inner surface of the cylinder.

An important feature of my invention lies in the means provided for making the pulp layers of successively-increasing density, and of course the number of layers may be multiplied at will, though I have found two layers of comparatively small thickness to answer all ordinary purposes.

In operation the loose lower pulp layer serves to gather the coarser particles held in suspension by the liquid, while the more dense upper layer serves to take out the finer particles, leaving the liquid clear. The effect of this arrangement is to produce a filter which is not easily clogged and which has a large filtering capacity.

It is obvious that the relative densities of the pulp layers may be varied within the limits of the apparatus by regulating the amount of material put into the pulp-chambers and that any desired relative thicknesses and densities of the pulp layers may be provided for in the construction of the filter by regulating the widths of the flanges on the pulp-chamber tops or covers in such manner that after the lower cover is seated the top cover shall be capable of further movement. The effect of the first downward pressure upon the cover of the cylinder is to force both pulp-chamber covers down till the metal surfaces of the lower chamber and its cover are in contact, after which there can be no further compression of the lower pulp layer during the further compression of the upper layer.

The cover of the cylinder is provided with an annular depression similar to that at the bottom of the cylinder, into which leads an opening K, which communicates with the cask or vat which receives the purified liquor. The purpose of these depressions, as is obvious, is to insure the discharge of all liquor from the filter when it is desired to change the pulp layers or cleanse the filter, the filter being rotatable upon the trunnions to bring the top or discharge end to the position of the bottom when it is desired to drain the filter or remove its contents.

Minor changes in the details of construction may be made without departing from my invention as defined by the appended claims. For instance, it is obvious that the form of the containing or filter cylinder may be modified by making a corresponding change in the form of the interior members; also, it is evident that the filter may be operated in different positions, though the preferred position is that shown, in which the water is caused to rise from below and pass out the top and where there is a tendency of the sediment to settle to the bottom rather than impregnate the pulp material.

What I claim as new, and desire to secure by Letters Patent, is—

1. In a filter, the combination of two or more superimposed pulp-chambers, pulp layers therein, covers for said chambers resting upon said pulp layers, means for forcing the cover of the lower chamber down through the medium of the upper chamber, and means for limiting the downward movement of the cover of the lower chamber with relation to said chamber, whereby the pulp layers may be given a varying density, substantially as and for the purpose set forth.

2. In a filter, the combination of a pulp-chamber provided with a perforated bottom and an upturned rim, a perforated cover provided with a downturned flange fitting into said rim, a second pulp-chamber contacting with said cover and provided with a perforated bottom and an upturned rim, a perforated cover provided with a downturned flange fitting within said rim, pulp layers in said chambers contacting with said covers, means for forcing the top of the lower chamber down through the medium of the upper chamber, said rims or flanges serving to limit the relative movement of the covers with relation to their chambers, whereby the relative densities of the pulp layers are regulated, and means for preventing the escape of the liquid from between the pulp-chambers except by way of the perforations in the bottom of the upper chamber, substantially as and for the purpose set forth.

3. In a filter, the combination of a filter-cylinder, or similar containing-chamber, provided at its bottom with an inlet, an annular shoulder near the bottom of the cylinder, a gasket contacting therewith, a pulp-chamber contacting at its circumference with said gasket and provided with a perforated bottom and an upturned rim closely fitting the cylinder, a pulp layer in said chamber, a cover resting thereon provided with a downturned flange fitting within said rim, a gasket above said cover at its circumferential portion, an upper pulp-chamber resting thereon provided with a perforated bottom and circumferentially with an upturned rim closely fitting the cylinder, a pulp layer in said upper pulp-chamber, a perforated cover resting thereon provided near its circumference with a downturned flange fitting within said rim, a cover for the cylinder resting on the cover of the upper pulp-chamber and provided with an outlet, and means for forcing the cylinder-cover down and through the medium thereof the lower covers, substantially as and for the purpose set forth.

4. In a filter, the combination of a containing-cylinder provided at its bottom with an inlet and a central upwardly-extending lug, a grooved annular shoulder near the bottom of the cylinder provided with a gasket, a pulp-chamber provided at its bottom with perforations, a central lug and flange resting on the corresponding parts of the cylinder, and provided also with an upturned rim closely fitting the cylinder, a pulp layer in the chamber, a perforated cover fitting snugly within the cylinder provided near its circumference with a downturned flange fitting within said rim and at its circumference with an upturned grooved flange provided with a gasket and centrally with an upturned lug, a similarly-constructed upper pulp-chamber and cover provided with central lugs and grooved gasket-fitted flanges supported by the lower chamber, a cover for the containing-chamber provided with a central lug and with a downturned flange fitting within the cylinder, and means connected with the cylinder and its cover for forcing the latter downward and through the medium thereof forcing the pulp-chamber covers home, substantially as and for the purpose set forth.

5. In a filter, the combination of a containing-cylinder provided on the interior of its bottom with a central lug surrounded by an annular depression into which opens an inlet, a gasket-fitted annular shoulder near the bottom of the cylinder, a flanged gasket-fitted perforated pulp-chamber provided with a lower screen, a pulp layer and an upper screen and provided at its bottom with a downturned lug, a flanged gasket-fitted cover resting upon the upper screen and provided centrally with an upturned lug, a similarly-constructed upper pulp-chamber, filter-layer, and cover therefor all supported on the cover of the lower pulp-chamber, a gasket on the grooved upturned flange of the upper pulp-chamber cover contacting with the inner cylinder-surface, a cover for the containing-chamber provided with a grooved flange fitting within the cylinder and resting on said gasket and provided also with a central lug surrounded by an annular depression from which leads an outlet-pipe, circumferentially-arranged slotted lugs on the cover, and pivotally-connected bolts at the cylinder-top fitting into the slots and provided with nuts for forcing the cover down, and standards pivotally supporting the containing-cylinder to permit its reversal, substantially as and for the purpose set forth.

ISIDOR KOHN.

In presence of—
R. T. SPENCER,
J. H. LEE.